United States Patent
Hou et al.

(10) Patent No.: US 6,893,040 B2
(45) Date of Patent: May 17, 2005

(54) SAFETY SEAT ANCHORING MECHANISM FOR STROLLER

(75) Inventors: Jen-En Hou, Pu-Tzu (TW); Chuan-Tso Tai, Hsin-Kang Hsiang (TW)

(73) Assignee: Link Treasure Limited, Tai-Po (TW)

( * ) Notice: Subject to any disclaimer, the term of this patent is extended or adjusted under 35 U.S.C. 154(b) by 90 days.

(21) Appl. No.: 10/331,993

(22) Filed: Dec. 31, 2002

(65) Prior Publication Data

US 2004/0124610 A1 Jul. 1, 2004

(51) Int. Cl.⁷ .............................................. B62B 1/00
(52) U.S. Cl. ................ 280/642; 297/183.2; 297/183.3; 297/183.4
(58) Field of Search ................. 280/642, 647, 280/643, 648, 649, 650, 657, 658, 47.38, 47.4, 644; 297/183.2, 183.3, 183.4, 256.16; 403/49, 92, 93, 95, 96

(56) References Cited

U.S. PATENT DOCUMENTS

| | | | | |
|---|---|---|---|---|
| 5,676,386 A | * | 10/1997 | Huang | 280/30 |
| 5,865,447 A | * | 2/1999 | Huang | 280/30 |
| 6,286,844 B1 | * | 9/2001 | Cone et al. | 280/47.41 |
| 6,446,990 B1 | * | 9/2002 | Nania et al. | 280/47.371 |
| 2003/0111825 A1 | * | 6/2003 | Lo et al. | 280/642 |

* cited by examiner

Primary Examiner—Bryan Fischmann
(74) Attorney, Agent, or Firm—Birch, Stewart, Kolasch & Birch, LLP

(57) ABSTRACT

A safety seat anchoring mechanism for a stroller and particularly an anchoring mechanism that has a pair of anchor docks connecting to a frame and having a coupling member formed on each anchor dock. The safety seat has a body pivotally coupling with a handle. The handle may be turned relative to the body with an adjusting apparatus to switch to a carrying position and an anchored position. The lower side of the handle is extended to form an anchor hook that is turnable with the handle. When anchoring the safety seat, move the handle to the carrying position and place the body above the anchor docks. Then turn the handle to a usage position to couple the anchor hook with the coupling member and form a latched condition. The anchor position is also attained by switching the handle position. The invention provides direct and effective movements to achieve safety and to prevent inadvertent misuse.

9 Claims, 9 Drawing Sheets

SAFETY SEAT ANCHORING MECHANISM FOR STROLLER

FIELD OF THE INVENTION

The invention relates to a safety seat anchoring mechanism for a stroller, and particularly an anchoring mechanism for fastening a safety seat to a stroller to facilitate transportation, and having a turnable safety seat handle to anchor the safety seat.

BACKGROUND OF THE INVENTION

Conventional strollers are simple transportation apparatus to enable parents to move infants or babies. When arriving at the destination of an outdoor trip, the infant must be moved from the car seat to the stroller to make carrying of the infant easier. According to present regulations, an infant must be seated in a safety car seat when riding in a car. For safety considerations, the safety car seat must be fastened by a five-point safety belt. When the infant is put in a stroller, a three-point or five-point safety belt must be fastened. Hence to move a sleeping infant in the car, the five-point safety belt in the car must be unfastened, and the safety belt of the stroller is then fastened. This changeover usually wakes the infant.

To remedy the problem mentioned above, strollers in combination with a safety seats have been developed, such as the one disclosed in U.S. Pat. No. 5,676,386. It mainly includes an armrest and a safety seat assembly that may be coupled together or separated from each other so that the sleeping baby may be moved from a car to a stroller without being disturbed. The safety car seat has a matching securing mechanism to achieve anchoring. While the design for such products has heavily focused on convenience and easy operation, with products for infants safety is an important issue that often outweighs convenience. In terms of structure, the features for convenience do not necessary all meet the safety requirements. The patent mentioned above employs an elastic element to achieve automatic positioning. The securing mechanism is quite complicated. In most conventional structures, in order to improve convenience, automatic coupling is adopted, so the fastening condition of the safety seat could be inadvertently overlooked by some parents. Moreover, the growing complexity of the structures also increases the frequency of malfunction. In addition, the technical components mostly adopt elastic elements. These elements have fatigue problems and are prone to result in ineffective or failed coupling. Hence while contemporary products that use elastic elements and a single operational structure might be convenient, their complicated constructions often compromise safety.

SUMMARY OF THE INVENTION

In view of the aforesaid disadvantages of the conventional safety seats for infants, the primary object of the invention is to provide a safety seat anchoring mechanism that has a frame connecting to a pair of anchor docks. Each anchor dock has a coupling member. The safety seat has a body pivotally engaged with a handle. The handle may be turned relative to the body by controlling an adjusting apparatus for switching to a carrying position and an anchor position. The handle is extended from a lower side to form an anchor hook that is movable with the turning of the handle. By means of such a construction, when anchoring the safety seat, the handle is moved to the carrying position to enable the body to be disposed above the anchor dock. The handle is then turned to a usage position to make the anchor hook located below the handle couple with the coupling member of the anchor dock to form a latched condition. Thus by switching the position of the handle, anchoring can be simultaneously accomplished. The movement is direct and can prevent negligence of users to improve safety.

One feature of the invention is that the anchor dock may be integrally formed on a connection joint, or be connected to the front leg tube or handle tube of the frame in a separated manner.

Another feature of the invention is that the handle of the safety seat may be switched to a carrying position, an anchor position and a stop position to allow users to choose as required. The operation is simple and may be matched with the anchoring methods of the stroller for ease of use.

Yet another feature of the invention is that the safety seat has an arched bottom section to function as a rocker for rocking forwards and rearwards.

Still another feature of the invention is that a retaining member is disposed in front of the frame to serve as a serving tray or a front armrest. The retaining member may be coupled with a seat canvas mounted onto the safety seat to confine the movement of the safety seat and to further enhance safety.

The foregoing, as well as additional objects, features and advantages of the invention will be more readily apparent from the following detailed description, which proceeds with reference to the accompanying drawings.

DESCRIPTION OF THE PREFERRED EMBODIMENTS

Figure 1:
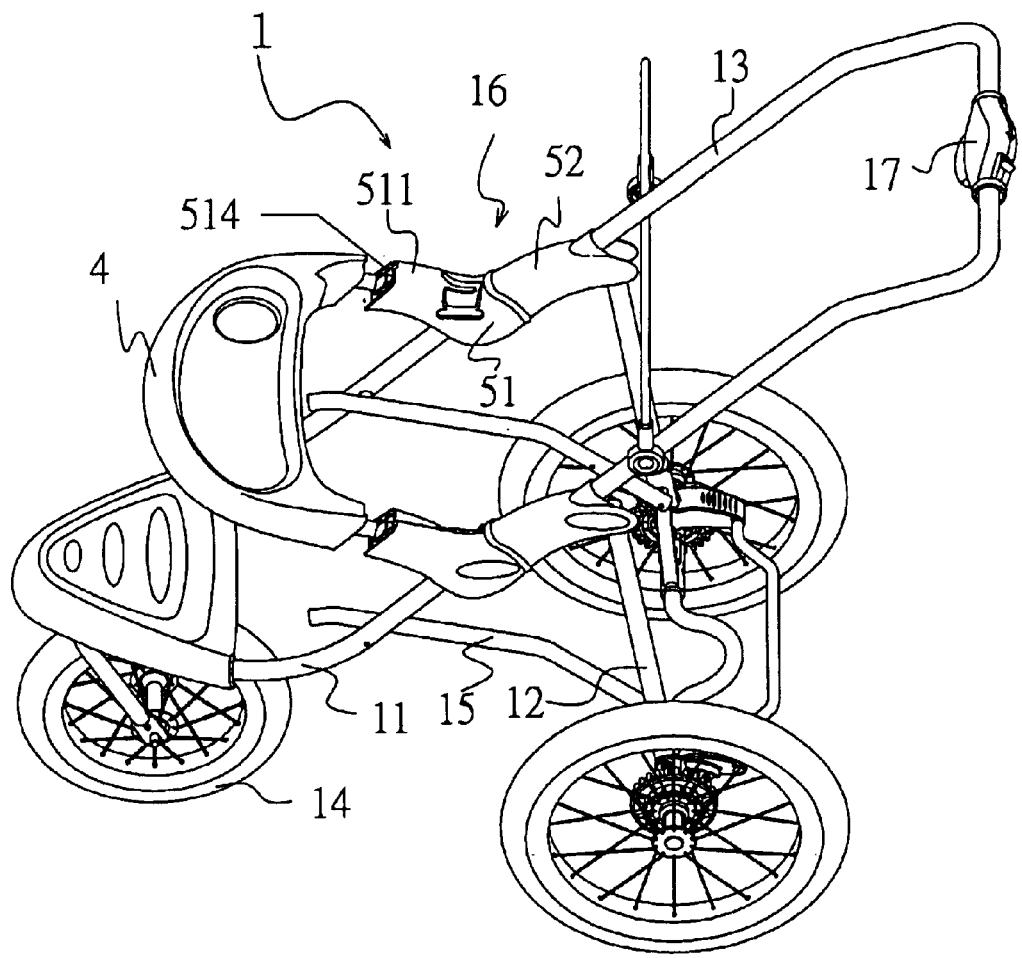
FIG. 1 is a perspective view of the frame according to the invention.
Figure 2:
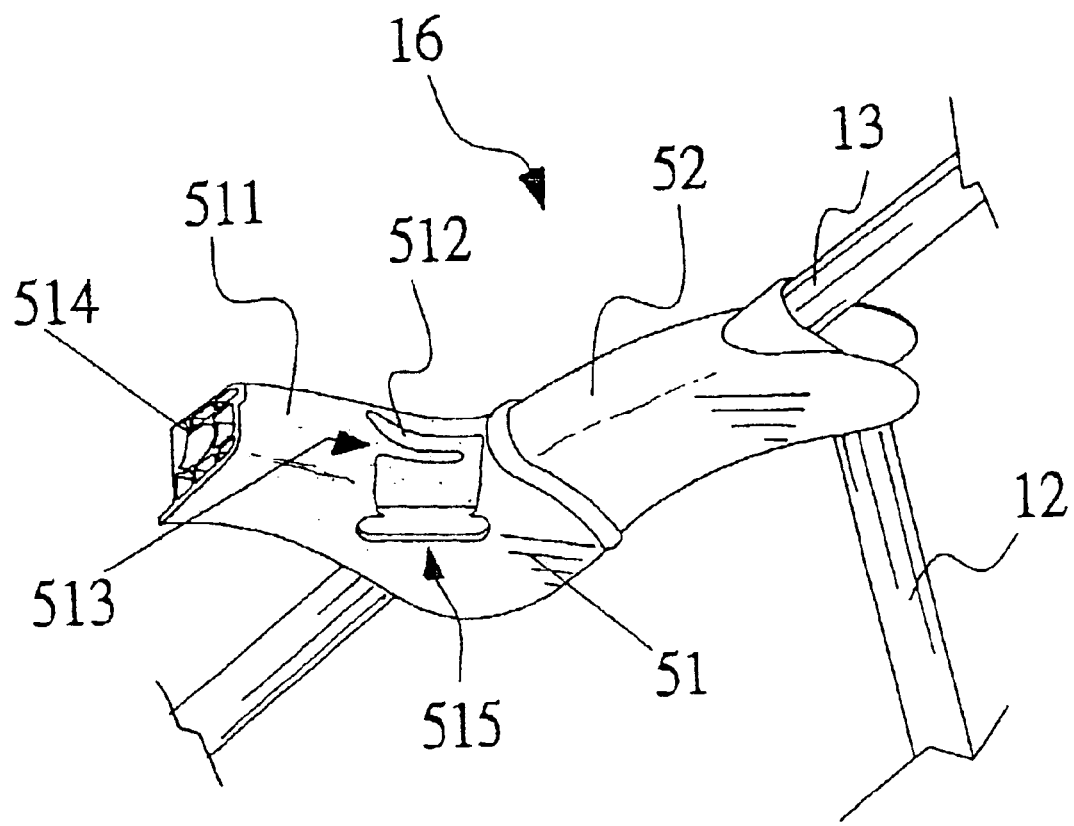
FIG. 2 is a perspective view of the connection joint of the frame of the invention.

Refer to FIGS. 1 and 2 for an embodiment of the invention. The safety seat anchoring mechanism of the invention includes a frame 1 and a safety seat 2.

The frame 1 consists of a front leg tube 11, a rear leg tube 12, a handle tube 13, a wheel set 14, a seat tube 15, a connection joint 16, a folding control set 17, a seat canvas 3 and a serving tray 4. The connection joint 16 has a lower joint 51 and an upper joint 52 to engage respectively and pivotally with one end of the front leg tube 11, the rear leg tube 12 and the handle tube 13. The seat tube 15 is pivotally engaged with the front leg tube 11 and the rear leg tube 12 to form a movable linkage. The folding control set 17 is mounted onto the handle tube 13 for releasing and latching the upper joint 52 and the lower joint 51 to extend and fold the frame 1. The seat canvas 3 is coupled on the seat tube 15 and the handle tube 13 to form a holding space to carry the infant. There is an anchor dock 511 extending from the lower joint 51. The anchor dock 511 has an anchor section 515 and a coupling section 512. Below the coupling section 512, there is a transverse open end 513. The anchor dock 511 may be integrally formed on the connection joint 16, or installed separately on the front leg tube 11 or the handle tube 13.

In addition, the lower joint may have a coupling section 514 to form a detachable link with the serving tray 4. The serving tray 4 may also be replaced by a front armrest (not shown in the drawings). The serving tray 4 or the front armrest form a retaining member on the frame 1 to guard the infant. The serving tray 4 or the front armrest may also be coupled with the front leg tube 11 (not shown in the drawings).

Figure 3:
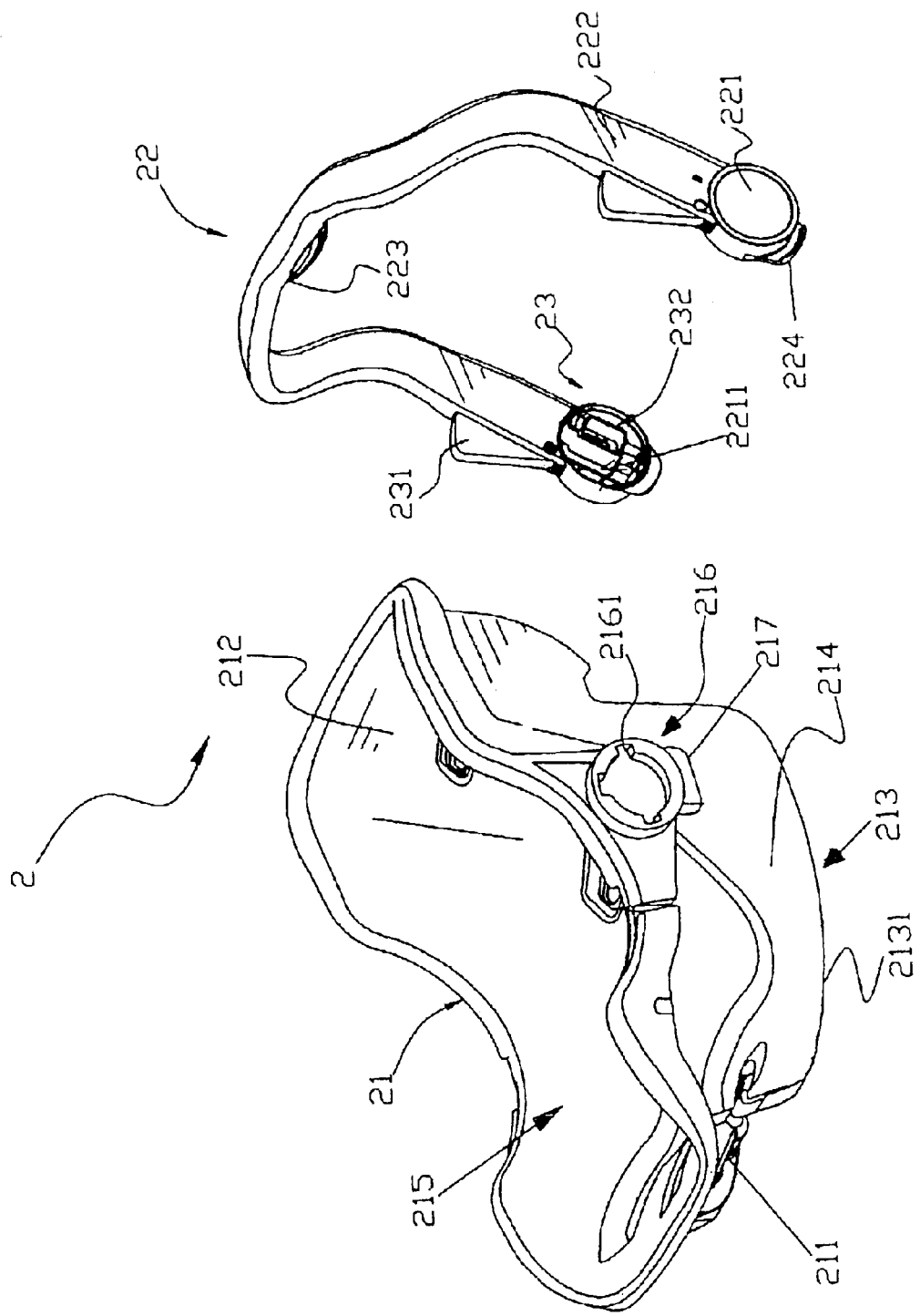
FIG. 3 is an exploded view of the safety seat of the invention.
Figure 4:
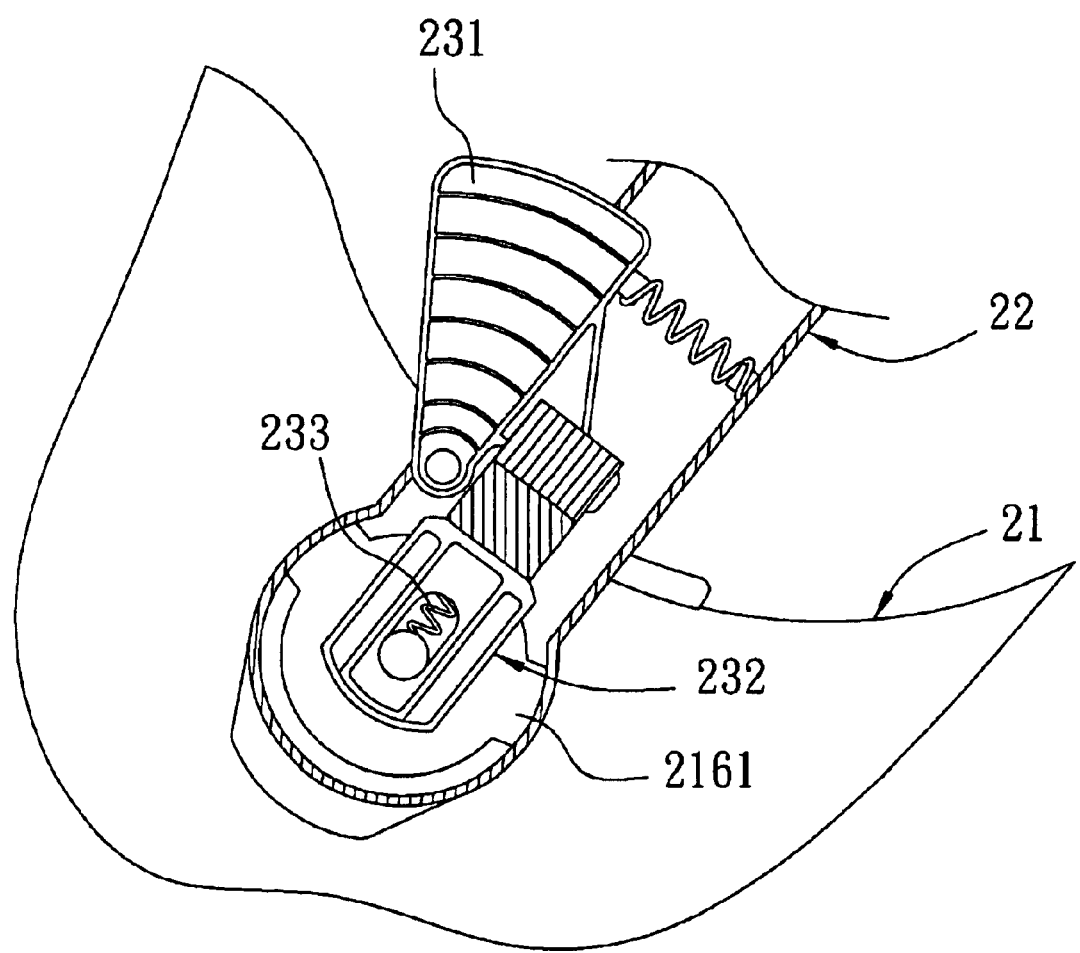
FIG. 4 is a fragmentary sectional view of the safety seat of the invention.

Referring to FIGS. 3 and 4, the safety seat 2 consists of a body 21, a handle 22 and a release apparatus 23. The body 21 includes a front side 211, a rear side 212, a bottom side 213 and two lateral sides 214 to form a housing space 215 to hold the infant. The bottom side 213 forms an arched section 2131 to allow the body 21 to function as a rocker when laid on the floor. The two lateral sides 214 of the body 21 further have an adjusting position 216 located on a desired spot to couple with the handle 22. The adjusting position 216 has a plurality of anchor grooves 2161. At the bottom of the two lateral sides of the body 21, there is an anchor member 217 for coupling with the anchor section 515 of the frame 1.

The handle 22 is formed in a "⊓" shape and includes a connecting section 221, a leg 222 and a grip section 223. The inner side of the connecting section 221 has a housing trough 2211 to receive the latch member 232 of the release apparatus 23. The handle 22 may be pivotally engaged with two sides of the body 21 at the center portion thereof. The bottom of the connecting section 221 is extended to form an anchor hook 224, which is turnable with the handle 22.

Figure 5:
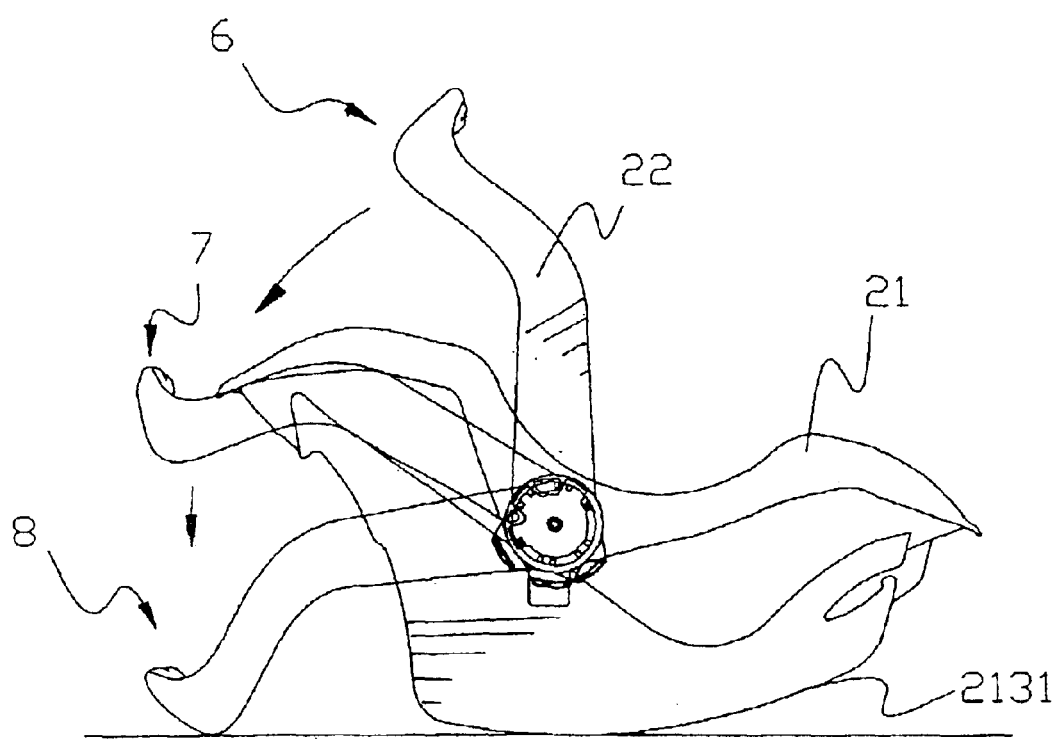
FIG. 5 is a schematic view of the handle of the safety seat of the invention in various moving conditions.

The release apparatus 23 is located between the body 21 and the handle 22. It includes a pushbutton 231, a latch member 232 and at least one elastic element 233. The latch member 232 is located in the housing trough 2211 and the anchor grooves 2161 between the body 21 and the handle 22. The elastic element 233 enables the latch member to maintain a latched state in normal conditions. The pushbutton 231 is located at one side of the latch member 232 for moving and separating the latch member 232 from the anchor grooves 2161 to a released position so that the handle 22 may be turned freely relative to the body 21. Through the control of the pushbutton, the handle may be moved to a carrying position 6, an anchor position 7 and a stop position 8 in contact with the floor to prevent the body from rocking (as shown in FIG. 5).

Figure 6:
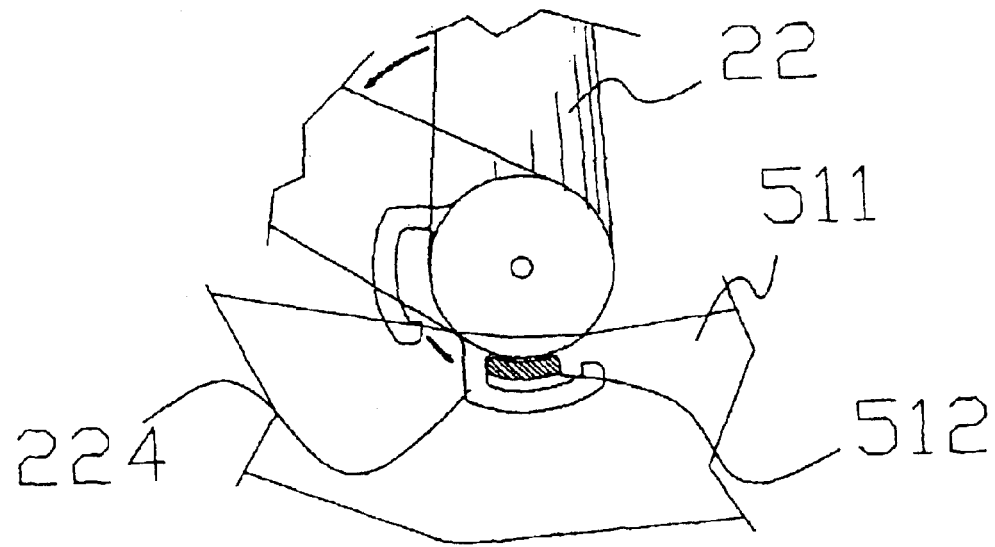
FIG. 6 is a schematic view of the invention, showing the anchor hook coupled with the anchor dock.
Figure 7:
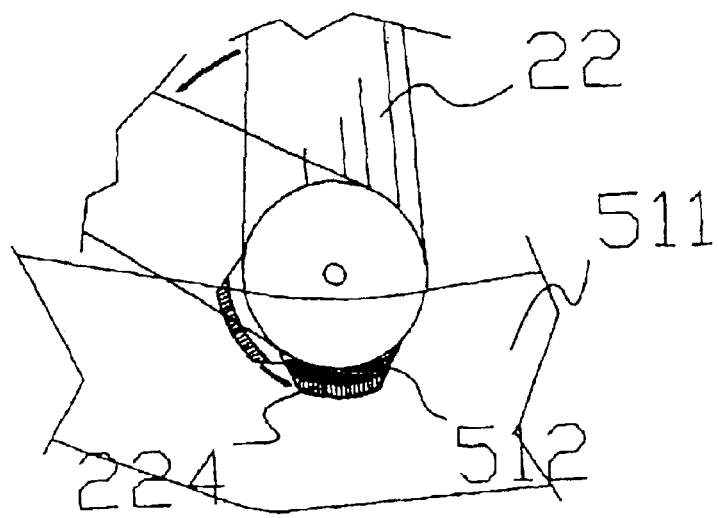
FIG. 7 is a schematic view of another embodiment of the invention, showing the anchor hook coupled with the anchor dock.
Figure 10:
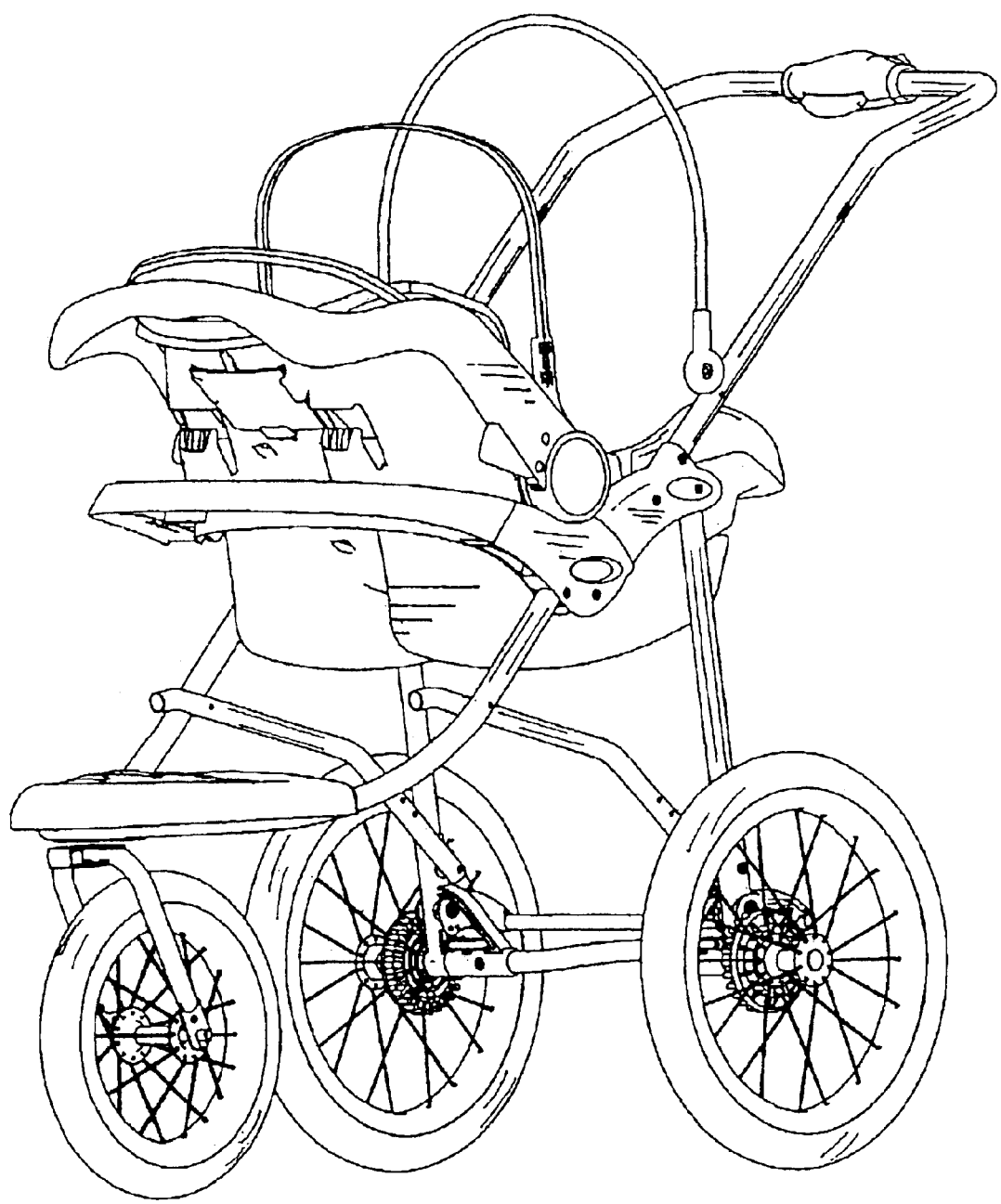
FIG. 10 is a pictorial view of the invention after assembly.

Referring to FIGS. 6 though 9, when anchoring the safety seat 2 on the frame 1, first, put the safety seat 2 in the carrying position 6, and place the connecting section 221 of the handle 22 on the anchor dock 511 and wedge the anchor member 217 located on the lateral bottom of the body 21 into the anchor section 515 of the lower joint 51 to make the safety seat 2 form an initial anchoring on the frame 1. Then release the handle 22 through the pushbutton 231 of the release apparatus 23 to enable the handle 22 to turn relative to the body 21. When the handle 22 is turned to the anchor position 7, as the anchor member 217 is located in the anchor dock 511 and the body 21 is stationary relative to the frame 1, the anchor hook 224 is moved synchronously with the handle 22 so that the anchor hook 224 is turned and wedged past the open end 513 below the coupling member 512 of the anchor dock 511. Therefore the safety seat 2 is latched on the frame 1 in an anchored state (as shown in FIG. 10).

Figure 8:
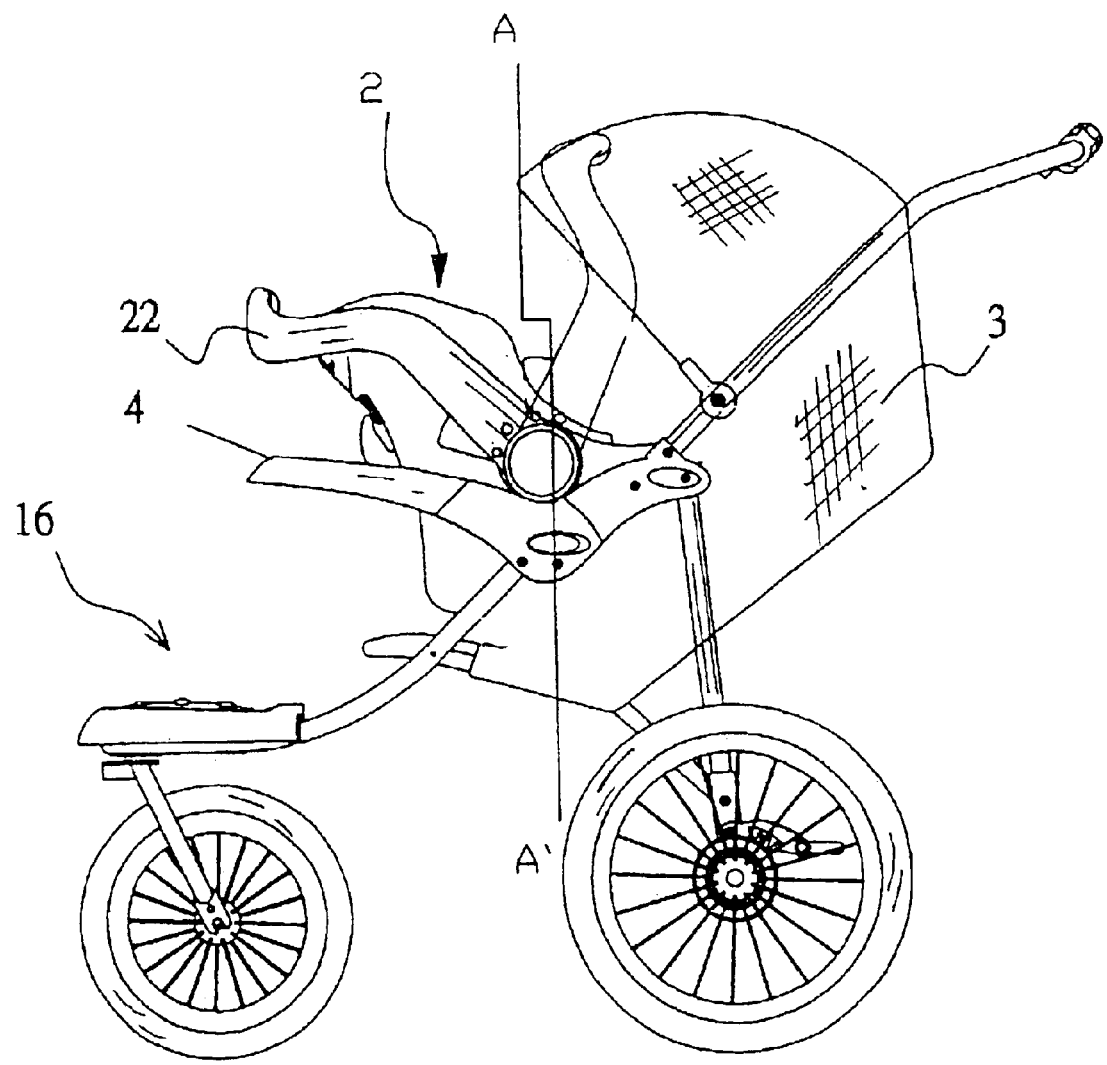
FIG. 8 is a schematic view of the invention, showing the safety seat coupled with the frame.
Figure 9:
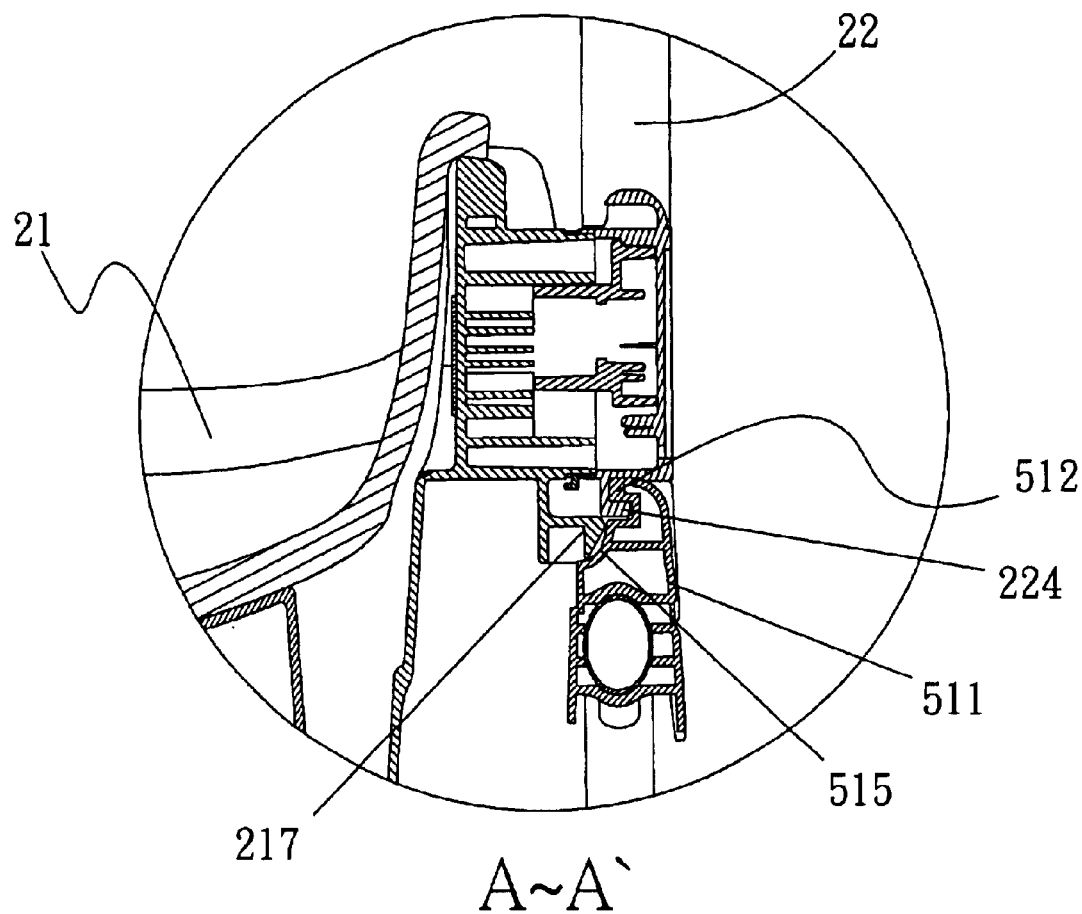
FIG. 9 is a fragmentary sectional view of the invention.

Meanwhile, the serving tray 4 on the frame 1 and the seat canvas 3 are guarding in front of the front side 211 and the rear side 212 of the body 21 of the safety seat 2. In addition, in order to prevent the safety seat 2 from turning and separating (as shown in FIG. 8) when carrying the safety seat 2, release the release apparatus 23 between the handle 22 and the body 21. The handle 22 may be turned to the release position 6, and the anchor hook 224 may be separated from the coupling section 512, then the safety seat 2 may be removed smoothly from the frame 1.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A safety seat anchoring mechanism for stroller for coupling a car safety seat to a frame of a stroller through a handle of the safety seat, the anchoring mechanism comprising at least:

a pair of anchor docks connected to two sides of the frame each having at least one coupling member; and an anchor hook is connected to each lower end of the handle being turnable with the handle for latching to a lower side of the coupling member to allow the car safety seat be fastened to the frame of the stroller, wherein the safety seat includes a body, a handle and a release apparatus, the handle being pivotally engaged with the body and turnable relative to the body through controlling of the release apparatus to a carrying position, an anchor position and a stop position.

2. The safety seat anchoring mechanism for stroller of claim 1, wherein the frame includes a handle tube, a front leg tube, a rear leg tube, a seat tube and a connection joint.

3. The safety seat anchoring mechanism for stroller of claim 1, wherein the body has a bottom section formed as an arched section.

4. The safety seat anchoring mechanism for stroller of claim 1, wherein the body has two lateral sides each having a plurality of anchor grooves formed thereon.

5. The safety seat anchoring mechanism for stroller of claim 1, wherein the release apparatus includes a pushbutton, a latch member and at least one elastic element, the latch member being located between the body and the handle for latching on the anchor grooves through the elastic element to form a latched position, the pushbutton being depressible to separate the anchor member from the anchor grooves to form an adjustable condition.

6. The safety seat anchoring mechanism for stroller of claim 1, wherein the anchor dock is fastened to a front leg tube of the frame.

7. The safety seat anchoring mechanism for stroller of claim 1, wherein the anchor dock is connected to a connection joint.

8. The safety seat anchoring mechanism for stroller of claim 7, wherein the connection joint includes an upper joint and a lower joint.

9. The safety seat anchoring mechanism for stroller of claim 8, wherein the anchor dock is integrally formed on the lower joint.

* * * * *